United States Patent
Spilman et al.

(12)

(10) Patent No.: US 6,306,956 B1
(45) Date of Patent: Oct. 23, 2001

(54) AQUEOUS DISPERSION OF HIGH MOLECULAR WEIGHT POLYESTER FOR CHIP RESISTANT PRIMER

(75) Inventors: Gary Eugene Spilman, Lake in the Hills; Michael Charles Knight, Jr., McHenry; Lisa Kay Kemp, Algonquin; Joseph Leo Nothnagel, Woodstock, all of IL (US)

(73) Assignee: McWhorter Technologies, Inc., Carpentersville, IL (US)

( * ) Notice: Subject to any disclaimer, the term of this patent is extended or adjusted under 35 U.S.C. 154(b) by 0 days.

(21) Appl. No.: 09/406,262

(22) Filed: Sep. 24, 1999

Related U.S. Application Data

(63) Continuation-in-part of application No. 09/161,145, filed on Sep. 25, 1998, and a continuation-in-part of application No. 09/160,843, filed on Sep. 25, 1998.

(51) Int. Cl.$^7$ .............................. C08L 67/02; C08L 75/06; C08L 77/00
(52) U.S. Cl. .................. 524/601; 524/507; 524/539; 524/602; 524/845
(58) Field of Search ..................................... 524/507, 539, 524/601, 602, 845

(56) References Cited

U.S. PATENT DOCUMENTS

| 3,960,789 | | 6/1976 | Daimer et al. | ........................ 260/21 |
| 4,476,261 | * | 10/1984 | Patzschke et al. . | |
| 4,968,536 | * | 11/1990 | Goldner et al. . | |

* cited by examiner

*Primary Examiner*—Tae H. Yoon
(74) *Attorney, Agent, or Firm*—Fitch, Even, Tabin & Flannery

(57) ABSTRACT

The present invention is directed to an aqueous dispersion of a polyester salt and polymeric vehicles which include the aqueous dispersions of a polyester salt. The polymeric vehicle is particularly effective for providing coating binders in cured primer coatings. The primer coating compositions are useful for multilayer paint coating films which have at least two layers of paint film including the cured primer coating composition film. The use of the primer polymeric vehicles of the present invention in conjunction with one or more additional overlaying top coating film layers provide a multiple layer coatings having improved adhesion and chip resistance.

18 Claims, No Drawings

AQUEOUS DISPERSION OF HIGH MOLECULAR WEIGHT POLYESTER FOR CHIP RESISTANT PRIMER

The present application is a continuation-in-part application of U.S. Ser. No. 09/161,145 filed Sep. 25, 1998 and of U.S. Ser. No. 09/160,843 filed Sep. 25, 1998.

The present invention relates to stable aqueous polyester dispersions useful as primers. More particularly, the aqueous polyester dispersions balance relatively high molecular weights and low hydroxyl numbers to provide a primer coating that effectively improves chip resistance of paint coatings overlaying the primer while maintaining adhesion and low levels of volatile organic compounds and low viscosities.

BACKGROUND OF THE INVENTION

Automotive and other durable coatings are complex multilayer systems which rely on certain performance criteria at each level for overall success. The bulk of the responsibility for providing improved chip resistance lies with the primer surface layer. However, improving chip resistance properties of automotive coatings or other types of protective or decorative durable coatings is clearly a system-dependent task. For many systems, there appears to be several key ingredients to achieving incremental improvements. A chip-resistance test is by nature high in stress, impact, and shear, which intuitively generates hypotheses based on the softness, or rubber-like characteristics of the primer layer. Any contributions from the primer to increase brittleness eventually may lead to reduced chip performance. This can be related to the degree of cross linking. Very low and very high levels of cross linking in such systems lead to poor chip resistance. In the case of low cross linking, the coating does not possess the strength properties necessary to withstand the impact and shear forces applied by the gravel. The base molecular weight is usually too low to provide appropriate elastic properties associated with light cross linking. The result is flow and scission on gravel impact. An extremely high cross link density affords large numbers of covalent cross links which impart brittleness to the coating, and failure is based on the inability of the coating to absorb and evenly distribute these concentrated forces applied at the gravel impact. The material neither flows, nor elastically deforms, but instead suffers brittle fracture. Further, cross linkers often cause VOCs by virtue of VOC by product release from the cross link reaction between the cross linkers and polymeric resin. Also complicating systems which use separate cross linking agents is the propensity for the cross linking agent to react with itself. For example, self-condensation of melamine cross linkers is a potential competing reaction, which may result in local areas of high concentration of highly cross linked melamine resin. This would produce localized brittleness which may result in chip or adhesion failures. Another key contributor to successful chip resistance is the adhesion of the primer to the substrate, and the subsequent adhesion of another paint coating to the primer (collectively intercoat adhesion). A major contributor to this effect is the functionality of the primer resin-polar group functionality including hydroxyl and carboxyl that play a key role in interactions with the substrate and other paint layers.

In order to obtain the optimal chip-resistant properties, the coatings overlying the primer and the primer base resin must each deliver a balance of properties to the final coating. The easiest way to maximize mechanical properties of the primer resin is to increase molecular weight. Increases in molecular weight, however, generally increase the viscosity of such resins. While high viscosity resins may be cut with organic solvents, this results in an undesirable increase in volatile organic compounds (VOCs).

SUMMARY OF THE INVENTION

The present invention is directed to an aqueous dispersion of a polyester salt and polymeric vehicles which include the aqueous dispersions of a polyester salt. The polymeric vehicle is particularly effective for providing coating binders in cured primer coatings (the cured primer paint coating film). The primer coating compositions (also known as formulated coating compositions) are useful for multilayer paint coating films which have at least two layers of paint film including the cured primer coating composition film. The use of the primer polymeric vehicles of the present invention in conjunction with one or more additional overlaying top coating film layers provide a multiple layer coating system having improved adhesion and chip resistance.

The primer polymeric vehicle of the invention permits the use of less cross linker to cross link the polyester salt. The use of less cross linker results in the release of less VOCs upon cross linking and a lower cross linker density in the cured coating binder film of in the cured primer coating composition. The reduced cross link density with the relative high molecular weight of the polyester salt provides improved chip resistance. While not intending to be bound by a theory, the polyester salt of the present invention has a higher molecular weight which enhances chip resistance and needs less cross linker (which also enhances chip resistance) to cure into a useable film than a polyester which is compositionally the same (and is not a metal or ammonium salt), but has a lower molecular weight. These lower molecular weight polymers are used in high solids systems and are dispersed in an organic solvent or mixed organic/water solvent system. Moreover, the molecular weight of the polyester in the latter high solids system can not be increased without also increasing the viscosity of the polymer dispersion or solution (increasing molecular weight inherently increases viscosity in such systems). Hence, the polymeric vehicle of the present invention includes a water dispersible polyester salt having unique combination of high molecular weight, a relatively low hydroxyl value or number, a unique ratio of hydroxyl value to number average molecular weight and a polyester with an acid value which permits formation of the water dispersible salt.

The polyester salt is cross linkable to form a cured coating binder in a primer paint coating film which is chip resistant when it is part of a multilayer paint coating system which has at least two paint film layers including the cured primer paint coating film layer. The cured coating binder of the primer of the invention also renders the multilayer paint coating system chip resistant. Hence, the polymeric vehicle of the primer coating composition balances the hydroxyl value and number average molecular weight of the polyester salt in the aqueous dispersion to provide VOC reduction through the use of an aqueous system with reduced amount of cross linker as well as improved chip resistance and adhesion for the cured primer paint coating film of the primer coating composition.

For enhancing chip resistance of coatings systems in which primers of the invention are used, the desired hydroxyl number is generally inversely related to the polyester molecular weight. By way of example, the polymeric vehicle for the primer coating composition or formulated coating comprises an aqueous dispersion of a polyester salt which is the residue of a polyester having a number average molecular weight of about 1500 Daltons and a hydroxyl value of about 90. In such aspect, the polyester has a hydroxyl equivalent weight of about 600. This aqueous dispersion is effective for providing the polymeric vehicle with less than about 5 weight percent organic solvent. At a higher molecular weight, the polymeric vehicle for the primer coating composition or formulated coating comprises an aqueous dispersion of a polyester salt which is the residue of a polyester having a number average molecular weight of about 2800 Daltons and a hydroxyl value of about 50. In such aspect, the polyester has a hydroxyl equivalent weight of about 1100. This aqueous dispersion is effective for providing the polymeric vehicle with less than about 5 weight percent organic solvent.

The chip resistance of the multilayer paint coating system which includes the coating binder of the primer of the invention, is superior to the chip resistance of a multilayer paint coating system which includes a primer which has compositionally the same polyester which has a lower molecular weight and is not a salt. It is these latter lower molecular weight polyesters which are generally used with organic solvent or mixed organic/water solvent systems. They are high in VOCs and generally require more cross linker to cure than the polymeric vehicle of the present invention.

In an important aspect of the invention, the polymeric vehicle for the primer coating composition or formulated coating comprises an aqueous dispersion of a polyester salt which is the residue of a polyester having a number average molecular weight of at least 1500 Daltons and a hydroxyl value of not more than 90. In one aspect, the polyester has a hydroxyl equivalent weight of about 600 to about 1100. This aqueous dispersion is effective for providing the polymeric vehicle with less than about 5 weight percent organic solvent. In another important aspect, the salt of the polyester in the aqueous dispersion has a particle size of less than 400 nm.

In yet another aspect, the polyester salt is the residue of a polyester having an acid value of at least 30, and in an important aspect, from about 40 to about 50, the polyester salt having a hydroxyl value of from about 90 to about 50 and the salt having a number average molecular weight of from about 1500 to about 2800 Daltons (not including the cationic portion of the salt, that is the salt includes the residue of a polyester where the polyester has a molecular weight of from about 1500 to about 2800 Daltons). The polymeric vehicle of the invention is effective for providing a multilayer paint coating system and primer coating binder with a two pint chip number rating of at least about 5 and a two pint chip size of at least about A (using the Society of Automotive Engineers Chip Test No. J400) when the polymeric vehicle of the primer is cured and a part of a multilayer paint coating system of at least two layers inclusive of the primer coating binder. Despite the use of a relatively high molecular weight polyester, the polymeric vehicle and the aqueous dispersion of the present invention have a viscosity of less than about 10 poise at a temperature of about 25° C. using less than about 5 weight percent organic solvent, and in an important aspect, less than about 2 weight percent organic solvent.

As previously stated above, the polyester salt requires less equivalent amounts of cross linker for cross linking than the same lower weight polyester (which is not a salt) having molecular weights of less than about 1500 Daltons, which polyester is generally less than about 800 Daltons. Suitable cross linkers include multifunctional amino resins and blocked isocyanate compounds. The polymeric vehicles of the invention generally will include from about 15 to about 25 weight percent crosslinker, based on the weight of the polymeric vehicle. Polymeric vehicles which use the low molecular weight polyesters previously described are polyesters which are not salts and which are used in high solids systems will generally require from about 35 to about 50 weight percent crosslinker.

In accordance with the present invention, an ionic functional polyester polymer is synthesized neat and subsequently mixed with hydrophilic organic solvent. The aqueous polymer dispersion is made by forming a polyester having sufficient ionizable groups to provide the polyester with an acid value of from about 30 to about 50. The polymer has a solubility in the hydrophilic solvent of at least about 50 weight percent, and the organic hydrophilic solvent has a solubility in water of at least about 5 weight percent. As previously stated, the polyester prior to neutralization reactions to form a salt, has a number average molecular weight of at least about 1500, and in an important aspect, about 1500 to about 2800 and a hydroxyl number of from about 50 to about 90. At least about 30 percent of the ionizable groups of the polyester polymer in the solvent are neutralized with an amount of neutralizer effective to form a solution of neutralized polymer salt. Thereafter the solution of neutralized polymer salt is mixed with water to form a blend of water/organic solvent/neutralized polymer. The organic solvent then is stripped from the latter blend at not more than about 65° C. to form a dispersion of neutralized polymer salt in water. This dispersion has a viscosity of less than about 10 poise at a temperature of about 25° C. The neutralizer may be any salt-forming base compatible with the ionizable functional polymer such as sodium hydroxide or an amine. In a very important aspect the neutralizer is an amine type which is selected from the group consisting of ammonia, triethanol amine, dimethyl ethanol amine, and 2-amino-2-methyl-1-propanol. Not all of the ionizable groups on the polymers need to be reacted with the base (or neutralized).

Depending on the type of ionizable groups present in the polymer it may be important that the polymer is neutralized before it is blended with water so that water dispersible neutralized ionizable groups are generally evenly distributed throughout the polymer. It is also important that the organic solvent and some water are removed or stripped from the blend at a duration, temperature and pressure effective for providing an aqueous dispersion having a resin mean particle size of not greater than about 400 nm. In an important aspect the polymer salt concentration is at least about 30 weight percent, the organic solvent concentration of less than 5 weight percent, and even less than 2 weight percent. In an important aspect, where the neutralizer is an amine or ammonia, the mean particle size of the resin is maintained with a stripping temperature of not more than about 65° C. at a pressure which permits such a stripping temperature.

In another aspect, the invention provides formulated coatings that include aqueous polymer dispersions of the invention with co-solvents selected from the group consisting of butoxy ethanol, diethylene glycol monobutyl ether, secondary butyl alcohol, propylene glycol n-butyl ether, dipropylene glycol n-butyl ether, propylene glycol n-propyl ether, propylene glycol t-butyl ether, and mixtures thereof. These formulated coating compositions generally will include rheology modifiers such as fumed silica and bentonite clays.

DETAILED DESCRIPTION

Definitions

"Hydroxyl number" or "hydroxyl value" which is also called "acetyl value" is a number which indicates the extent to which a substance may be acetylated; it is the number of milligrams of potassium hydroxide required for neutralization of the acetic acid liberated on saponifying 1 g of acetylated sample. For purposes of this application, hydroxyl number is based on solid polyester in the system and not on solution. "Hydroxyl equivalent weight" is calculated from the hydroxyl number (OHN) per ASTM D1957 as follows. Hydroxyl Equivalent Weight=56,100/OHN The hydroxyl number units are mg KOH/gram of resin solids.

"Polymeric vehicle" means all polymeric and resinous components in the formulated coating, i.e., before film formation, including but not limited to the water dispersible salt of a polymer. The polymeric vehicle may include a cross linking agent.

"Coating binder" means the polymeric part of the film of the coating after solvent has evaporated and after crosslinking.

"Formulated coating composition" means the polymeric vehicle and solvents, pigments, catalysts and additives which may optionally be added to impart desirable application characteristics to the formulated coating and desirable properties such as opacity and color to the film.

The term "aqueous medium" as used herein means water and a mixture of water and hydrophilic organic solvent in which the content of water is at least 10% by weight. Examples of hydrophilic solvents include alkylalcohols such as isopropanol, methanol, ethanol, n-propanol, n-butanol, secondary butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, dioxane, dimethylformamide, diacetone alcohol, methyl ethyl ketone, acetone, and tetrahydrofurfuryl alcohol.

"Ionizable group" refers to functional groups on the polymer that effect water dispersibility of the polymer. An example of an ionizable group includes —COOH.

"Neutralizer" refers to compositions which can react with ionizable groups on the polymer to affect water dispersibility. Examples of neutralizers useful in the present invention include amines, ammonia, and metal hydroxides including NaOH and KOH. In an important aspect of the invention, the neutralizers are amines and ammonia.

"Residue of a polyester salt" refers to the reaction product of an ionizable polyester with a neutralizer.

"Cross linker" or "cross linking agent" means a polyfunctional compound capable of reaction with a hydroxyl of a polyol or a phenol hydroxyl or both. These agents include a compound having di- or polyfunctional isocyanate groups or a polyfunctional amino resin. The isocyanate compound or amino resin contains isocyanate or other cross linking functional groups that are capable of forming covalent bonds with hydroxyl groups that are present on the polyester polyol in the polymeric vehicle. The cross linking agent may be a blend; hence, there may be more than one substance which forms a blend of substances which form covalent bonds with the hydroxyl groups of the polyester polyol. Amino reins and polyisocyanates are such cross linking agents.

"Isocyanate compound" means a compound which when reacted with an hydroxyl results in a carbamate linkage. The isocyanate compound may be a blocked polyisocyanate, a blocked biuret, a blocked uretdione and a blocked isocyanurate.

Diisocyanates which may be used in the invention additional to HDI include isophorone diisocyanate (IPDI), tetramethylxylene diisocyanate (TMXDI), and other aliphatic diisocyanates such as trimethylene diisocyanate, tetramethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate; cycloalkylene diisocyanates such as 1,3-cyclopentane-diisocyanate, 1,4-cyclohexane-diisocyanate and 1,3-cyclohexane-diisocyanate; and aromatic diisocyanates such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-tolulene diisocyanate.

"Polyisocyanate" can mean compounds with two or more isocyanate groups [—N=C=O] which compounds may be biurets and isocyanurates. The polyisocyanates may be dimerized or trimerized diisocyanates such as trimerized HDI or IPDI and triisocyanates such as triphenylmethane-4,4',41-triisocyanate, 1,3,5-triisocyanatobenzene, 1,3,5-triisocyanatocyclohexane, 2,4,6-triisocyanatotoluene and ω-isocyanatoethyl-2,6-diisocyanatocaproate; and tetraisocyanates, such as 4,4'-diphenyldimethylmethane-2, 2',5,5'-tetraisocyanate.

"Carbamate linkage" means —OC(=O)N(—H)— which can be a urethane linkage.

"Biuret" means an isocyanate reacted with water in a ratio of three equivalents of isocyanate to one mole of water, such as the biuret of HDI shown below:

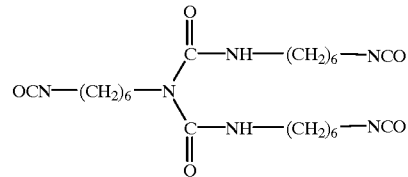

An "isocyanurate" is a six-membered ring having nitrogens at the 1, 3 and 5 positions and keto groups at the 2, 4 and 6 positions, the nitrogens being substituted with an isocyanate group, such as shown below in the isocyanurate of HDI.

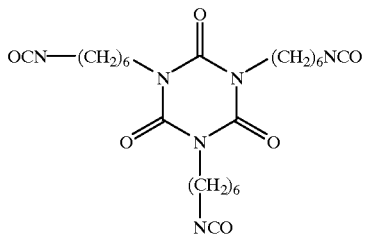

Methylol (alkoxymethyl) amino crosslinking agents are suitable for use in the present invention and are well known commercial products, and are generally made by the reaction of di (poly) amide (amine) compounds with formaldehyde and, optionally, a lower alcohol.

"Aminio resins" includes melamine resins and may also be referred to as "melamine-formaldehyde resins" or "alcoholated melamine-formaldehyde resin." Examples of suitable amino-crosslinking resins include one or a mixture of the following materials:

Melamine based resins:

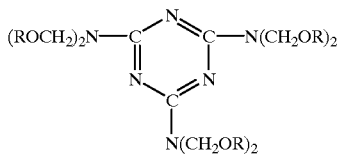

wherein R is the following:
R=CH$_3$ (Cymel)® 300, 301, 303);
R=CH$_3$, C$_2$H$_5$ (Cymel® 1116);
R=CH$_3$, C$_4$H$_9$ (Cymel® 1130, 1133);
R=C$_4$H$_9$ (Cymel® 1156); or
R=CH$_3$, H (Cymel® 370, 373, 380, 385).
The preferred melamine is hexamethoxymethyl melamine.
Benzoquanamine based resins:

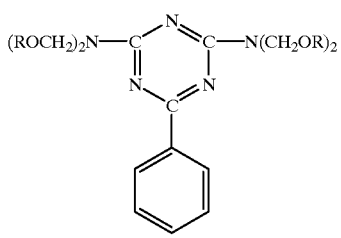

wherein R=CH$_3$, C$_2$H$_5$ (Cymel® 1123).
Urea based resins:

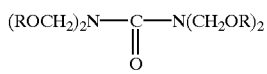

wherein:
R=CH$_3$, H (Beetle™ 60, Beetle™ 65); or
R=C$_4$H$_9$ (Beetle™ 80).
Gycoluryl based resins:

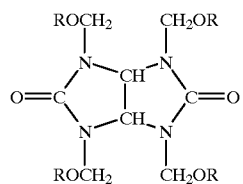

wherein:
R=CH$_3$, C$_2$H$_5$ (Cymel® 1171); or
R=C$_4$H$_9$ (Cymel® 1170).
"Polyester" means a polymer which has

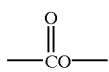

linkages in the main chain of the polymer.

As used herein, the reaction product of an alkali metal base or amine or ammonia with a carboxyl group or other ionizable group which is part of a polyester produces a "salt".

"Substantially solventless" means a polymeric vehicle or formulated coating composition having not more than about five weight percent organic solvent.

"Solvent" means an organic solvent.

"Organic solvent" means a liquid which includes but is not limited to carbon and hydrogen which liquid has a boiling point in the range of not more than about 150° C. at about one atmosphere pressure.

"Hydrophilic solvent" means a solvent that has a solubility in water of at least about 5 weight percent at room temperature.

"Volatile organic compounds" (VOCs) are defined by the U.S. Environmental Protection Agency at 40 C.F.R. 51.000 of the Federal Regulations of the United States of America.

A "high solids" or "high solids formulated coating composition" means an aqueous formulated coating composition containing more than about 30 weight percent solids, and in an important aspect of the present invention about 35 weight percent to about 70 weight percent solids as per ASTM test D-2369-92. "Film" is formed by application of the formulated coating composition to a base or substrate, evaporation of solvent, if present, and cross-linking if necessary.

"Baked formulated coating composition" means a formulated coating composition that provides optimum film properties upon heating or baking above ambient temperature.

"Dispersion" in respect to a polymeric vehicle, formulated coating composition, or components thereof means that the composition must include a liquid and particles detectable by light scattering.

"Dissolved" in respect to a polymeric vehicle, formulated coating composition or components thereof means that the material which is dissolved does not exist in a liquid in particulate form where particles larger than single molecules are detectable by light scattering.

"Soluble" means a liquid or solid that can be partially or fully dissolved in a liquid. "Miscible" means liquids with mutual solubility. "Imbibe water" means a liquid is miscible with water.

"Acid number" or "acid value" means the number of milligrams of potassium hydroxide required for neutralization of or reaction with ionizable groups present in 1 g of material, such as resin.

"Substantially free of emulsifier" means a composition with not more than about 0.5 weight percent emulsifiers. Aqueous dispersions of the present invention are substantially free of emulsifier.

As used herein the term "inversion" refers to a phase change where a mobile phase becomes a disperse phase. For example, an inversion takes place where sufficient oil is added to an oil in water phase such that phases invert to change from a oil in water phase to a water in oil phase. Conversely, in an "inversionless" system, the mobile phase does not become the disperse phase and the corresponding increase in viscosity associated with dispersions does not occur. In an important aspect of the present invention, the viscosity of the system during processing remains less than about 20 poise, and in a very important aspect, less than about 10 poise at 25° C.

Stage One: Preparation of Polyester

In accordance with stage one of the present invention, a polyester polymer is synthesized neat and subsequently blended into an organic hydrophilic solvent which has limited to infinite solubility in water. Polyester polymers useful in the present invention include those that provide a polyester salt where the polyester salt is the residue of a polyester having a number average molecular weight of from about 1,500 to about 2,800 Daltons. In an important aspect of the invention, the polyester polymers have an acid value of less than about 50, and in a very important aspect, about 30 to about 50.

The polyesters used herein are reaction products of polyhydric alcohols and polycarboxylic acids. Examples of suitable polyhydric alcohols include triols and tetraols such as trimethylolpropane, trimethylolethane, tris(hydroxyethyl) isocyanurate, glycerine, and pentaerythritol, and dihydric alcohols or diols that may include neopentyl glycol, dimethylol hydantoin, ethylene glycol, propylene glycol, 1,3-butylene glycol, diethylene glycol, dipropylene glycol, 1,4-cyclohexane dimethanol, Esterdiol 204 (trademark of Union Carbide), 1,3-propane diol, 1,6-hexanediol, and dimethylol propionic acid (DMPA). As can be seen from the reference to DMPA, polyhydric alcohols may have —COOH groups.

Carboxylic acids utilized in the invention may be aromatic carboxylic acids such as isophthalic acid, terephthalic acid, phthalic acid, phthalic anhydride, dimethyl terephthalic acid, naphthalene decarboxylate, tetrachlorophthalic acid, terephthalic acid bisglycol ester, and benzophenone dicarboxylic acid; and cycloaliphatic, aliphatic carboxylic acids, and polyacids such as trimellitic anhydride (TMA). As can be seen from the reference to TMA, diacids may have additional —COOH groups.

In another important aspect of the invention, the polyester polymers that are synthesized neat are blended with a solvent selected from the group consisting of alkylalcohols such as isopropanol, methanol, ethanol, n-propanol, n-butanol, secondary butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, dioxane, dimethylformamide, diacetone alcohol, methyl ethyl ketone, acetone, and tetrahydrofurfuryl alcohol. The polymers of the invention have a solubility at processing temperatures in the hydrophilic solvent of at least about 50 weight percent, more preferably at least about 80 weight percent, based on the total weight of the composition.

Stage one provides a resin in a hydrophilic solvent which can be stored, and which can be further processed in stage two. In an important aspect, the resin provided in stage one has a storage stability of at least about 6 months.

Stage Two: Polyester Dispersion

Neutralizing the Resin

The polyester salt is formed in situ in the organic solvent with water being mixed with the polyester salt/organic solvent combination. In accordance with the invention, neutralizer is added to an organic solvent solution containing the polyester in an amount effective for neutralizing the polyester to provide sufficient salt to render the polyester dispersible in water. Neutralizer useful in the present invention include but are not limited to ammonia, triethanol amine, dimethyl ethanol amine, 2-amino-2-methyl-1-propanol, NaOH and KOH.

The amount of neutralizer added is dependent on acid value and molecular weight. In one aspect, from about 30 to about 100 percent of the carboxyl groups are neutralized to obtain the solids level and low VOC level of the dispersions of the invention. In another aspect, neutralizer is mixed with the polyester polymer in an amount effective to provide at least about 70 parts polymer salt in less than about 30 parts solvent wherein with subsequent mixing with water, the neutralized polymer will provide a dispersion which comprises not more than about 70 weight percent water, based on the weight of the dispersion.

In a very important aspect of the invention, where the ionizable group is carboxyl, the polyester requires about 70% to about 100% neutralization to stabilize the dispersion. In another important aspect of the invention, the process provides a mean particle size of not more than about 400 nm, with a typical mean particle size in the range of about 40 nm to about 200 nm as measured by laser light scattering.

The polyester polymer can be preneutralized by making the polymer with metal, amine or ammonia salts of the ionizable groups such as —COOH. The polymer made from these "preneutralized" monomers would have an acid value, as measured by titration, of at least about 30 if the ionizable groups which form part of the polymer were not already neutralized. In this aspect of the invention, monomers have a polyfunctionality such as a difunctionality which permits them to form polymers that also have the salt form of the ionizable groups.

An example of such a monomer is

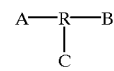

where A and B are —OH and/or —COOH which can form a polyester in a condensation reaction and C is —COOX, where X is an alkali metal such as sodium or potassium.

Addition of Water

In the next step or stage two of the process, water having a temperature of about 25° C. to about 65° C. is added to the neutralized resin solution. Lower temperatures provide smaller mean particle sizes.

In an important aspect of the invention, the initial ratio of solvent to water (solvent/water) is from about 0.15 to about 0.45 for polyester polymer. The initial ratio of solvent to water is important to ensure that inversion does not take place during subsequent stripping of solvent. The amount of water to be added may be greater than that required to obtain the desired solids of the final dispersion. Some water loss typically occurs during solvent distillation. The system requires sufficient solvent at the beginning to solubilize the salt prior to water addition.

In an alternative aspect of the invention, polymer in hydrophilic solvent is added to water that already contains a neutralizer.

Removal of Solvent

In the next step of the process, the organic solvent and water if required are removed or stripped from the neutralized resin/water/solvent mixture. A reduced atmospheric pressure may be applied to the mixture to aid in the removal of solvent and water. In an important aspect, vacuum may range from about 22 inches to about 29 inches of mercury gauge. With lower temperatures, a higher vacuum must be used to remove solvent. Lower reaction temperatures result in less foaming, as the higher vacuum coupled with the surface tension of the bubbles helps to break the bubbles. In another aspect of the invention, solvent/water is stripped with heat being supplied through the use of a heat exchanger. Use of a heat exchanger may reduce distillation times and temperatures and further minimize destruction of the salt.

In a very important aspect of the invention, solids levels of at least about 30 weight percent to about 45 weight percent can be attained for polyesters.

In another aspect of the invention, solvent that is removed can be purified and reused. A simple flash or multiple stage distillation is sufficient to clean the solvent of any contamination.

In an alternative aspect, the invention permits manufacture of the water dispersion from the polymer using one reaction vessel. The water dispersion of the invention does not require emulsifying agents and does not have more than about 2 weight percent, based on the weight of the composition, of organic solvent after the distillation of the solvent. In an important aspect, the aqueous dispersion contains from about 0.2 to about 2 weight percent organic solvent.

The water dispersion of the invention includes the water dispersible amine salt of the polymer as well as the unsalified polymer, but in the aspect of the invention where the ionizable group is a carboxyl, the aqueous dispersion of the invention does not have less than 30 percent of the free carboxyl groups of the polymer neutralized or converted into a salt. As the acid number of the polymer goes down, the higher the percent of the carboxyl groups on the polymer must be neutralized. Where the ionizable groups are —COOH, to maintain the dispersion below an acid value of about 15, about 100% of the carboxyl groups on the polymer should be neutralized to the salt. In an important aspect of the invention, about 100% of the carboxyl groups on the polymer are neutralized to the salt and the dispersions of the invention do not have more than about 1 pound per gallon of dispersion (120 g/l) VOCs, and in a very important aspect the dispersion has about 0.2 pounds per gallon of dispersion VOCs. The water dispersion of the invention with about 0.2 pounds per gallon VOC is stable through at least about 1 freeze-thaw cycle, and up to about 4 freeze-thaw cycles. Freeze-thaw cycles can be increased with small amounts of solvents or glycols as is typically used for latex systems.

Formulated Coating Compositions

The polymeric vehicle is incorporated into a formulated coating composition which upon heating provides a baked formulated coating composition or cured composition. Baking is above ambient temperatures with a cross linker to provide a coating binder. The polymeric vehicle which includes the water dispersion of the invention provides a formulated coating composition having VOCs of less than 1 pound per gallon of formulated coating composition, includes water dispersible polymers and salts thereof having the above indicated molecular weights and not only eliminates a need for, but is substantially free of emulsifiers, surfactants and coalescents.

Water dispersion of such high molecular weight polymers provide a coating binder and baked formulated coating compositions with improved film performance characteristics which include, but are not limited to improved chip resistance, adhesion which is just as good as lower molecular weight higher VOC systems, improved lay down performance of the wet film, enhanced film build of the film per pass, faster dry times, improved corrosion resistant films per pass, improved corrosion resistant films, harder films, more abrasion resistant films, and improved humidity resistant films. The polymeric vehicle of the invention also provides coating binders for improved exterior "ultraviolet resistant" durable films which are derived from an aqueous low VOC formulated coating composition. Films provided from the invention are improved over that of aqueous thermoplastic emulsions or water reducible systems of low molecular weight thermoplastic or those thermosetting polymers requiring cross linking.

The following examples illustrate methods for carrying out the invention and should be understood to be illustrative of, but not limiting upon, the scope of the invention which is defined in the appended claims.

EXAMPLES

Example 1

Polyester Dispersion

A. Synthesis of Polyester Polymer:
 1. 218.9 grams of neopentyl glycol (NPG), 77.2 grams of trimethylol propane (TMP), and 248.4 grams of 1,6-hexanediol (HDO) were charged to a round bottom flask equipped with a packed column, partial condenser, receiver, and nitrogen blanket.
 2. The flask was heated until the glycols were melted and 322.8 grams of Adipic acid (AA) and 322.8 grams of Isophthalic acid (IPtA) were added with mixing.
 3. The temperature was steadily and gradually increased to 220 degrees centigrade and waters of esterification were removed.
 4. When the acid value was 6.8, the temperature was reduced to 170 degrees centigrade.
 5. 80 grams of trimellitic anhydride (TMA) was added to the flask and the temperature was maintained at 170 degrees centigrade.
 6. Waters of esterification were removed until an acid value of 46.3 was reached.
 7. The temperature was reduced to 90 degrees centigrade and the polymer was cut with methyl ethyl ketone (MEK).

| Properties of the Polyester Solution: | | |
| --- | --- | --- |
| Percent Solids | (NVM) | 70 |
| Acid Value | (Mg KOH/g) | 45 |
| Molecular weight | (Mn) | 2350 |
| Hydroxy number | (Mg KOH/g) | 65 |

B. Preparation of Polyester Dispersion:
 1. 635 grams of the polyester solution in MEK and 26.4 grams of AMP-95 were charged to a round bottom flask equipped with a total condenser and receiver.
 2. The flask was heated to 40 degrees centigrade with mixing.
 3. Upon reaching temperature, 666 grams of deionized water was added over approximately 30 minutes.
 4. Vacuum was applied to the flask and slowly increased to a maximum of 26 inches of mercury.
 5. Vacuum was continued until the desired percent solids of the dispersion was reached.
 6. After the desired amount of distillate was removed, the vacuum was broken and the resulting product analyzed.

| Properties of the Polyester Dispersion: | | |
| --- | --- | --- |
| Percent Solids | (NVM) | 41.0 |
| Viscosity | (cps) | 45 |
| pH | (units) | 6.0 |
| particle size | (nm) | <80 |
| weight/gal | (lbs) | 8.9 |

Example 2

Polyester Dispersion

A. Synthesis of Polyester Polymer:
 1. 1170.0 grams of nenopentyl glycol (NPG), 412.5 grams of trimethyol propane (TMP), and 1687.5 grams of butylethyl-propanediol (BEPD) were charged to a round bottom flask equipped with a packed column, partial condenser, receiver, and nitrogen blanket.

2. The flask was heated until the glycols were melted, and 1725.0 grams of Adipic acid (AA) and 1725.0 grams of Isophthalic acid (IPTA) were added with mixing.

3. The temperature was steadily and gradually increased to 220 degrees Celsius and waters of esterification were removed.

4. When the acid value was 3.1, the temperature was reduced to 170 degrees celsius.

5. 427.5 grams of trimellitic anhydride (TMA) was added to the flask and the temperature was maintained at 170 degrees celsius.

6. Waters of esterification were removed until an acid value of 41.2 was reached.

7. The temperature was reduced to 90 degrees centigrade and the polymer was cut with isopropyl alcohol (IPA).

| Properties of the Polyester Solution: | | |
| --- | --- | --- |
| Percent Solids | (NVM) | 69.4 |
| Acid Value | (Mg KOH/g) | 41.1 |
| Molecular Weight | (Mn) | 2050 |
| Hydroxyl number | (mg KOH/g) | 65 |

B. Preparation of Polyester Dispersion:

1. 1352 grams of the polyester solution in IPA and 26.4 grams of N,N-dimethylethanolamine (DMEA) were charged to a round bottom flask equipped with a total condenser and receiver.

2. The flask was heated to 40 degrees Celsius with mixing.

3. Upon reaching temperature, 1476 grams of deionized water was added over approximately 30 minutes.

4. Vacuum was applied to the flask and slowly increased to a maximum of 26 inches of mercury.

5. Vacuum was continued until the desired percent solids of the dispersion was reached.

6. After the desired amount of distillate was removed, the vacuum was broken and the resulting product analyzed.

| Properties of the Polyester Dispersion: | | |
| --- | --- | --- |
| Percent Solids | (NVM) | 42.6 |
| Viscosity | (cps) | 45 |
| pH | (units) | 7.0 |
| particle size | (nm) | <80 |
| weight/gal | (lbs) | 8.9 |

Example 3

Paint Formulation with a Polyester Dispersion

Preparation of Paint:

The dispersed polyester from Example 1 was formulated into a primer as follows:

1. A 228 gram aliquot of resin dispersion prepared as described in Example 1 was placed in a one liter stainless steel mixing vessel.

2. 9 grams of propylene glycol monobutyl ether and 36 grams of deionized water were then added to the resin dispersion 3. A vertical disperser was then inserted.

4. 195 grams of TiO2 (R-960, DuPont) and 5 grams of Raven 16 were added under agitation.

5. Approximately 300 grams of 3 mm glass beads were added to the vessel, and the mixture was dispersed at high speed for 30 minutes to disperse the pigment to a 7 Hegman.

6. The mill was slowed to mixing speed, and the following let down ingredients were added under slow agitation:

143 grams of polyester dispersion
40 grams of Cymel 301
7.2 grams of Nacure 3525
0.5 grams of Surfynol 104BC 7. After incorporation of these ingredients, the mixture was filtered through a 25 micron filter cone to remove the glass beads. The pH then adjusted to 8.2 to 8.5 with AMP-95, and then reduced to 34–36 seconds #4 Ford cup with deionized water.

The resulting paint had a calculated VOC of less than 2.0 pounds per gallon and 51% weight non-volatile.

Properties of the Paint:

The formulated paint was tested by spraying onto high edge protection electrodeposition coated galvanized steel panels. Film thickness of the primer was 1.0 mil dry. The painted panel was flashed at room temperature for 5 minutes, and then flashed an additional 10 minutes in 180 degrees F. oven. The painted panel was baked 25 minutes at 330 degrees F. The top three inches of the panel was masked off and the panel was then top coated with a commercially available automotive waterborne base coat/clear coat system and baked 20 minutes at 275 degrees F. Adhesion was then checked with a 3 mm crosshatch of both the primer to electrocoat only area and the top coated area of the panel. Excellent adhesion was noted in both areas of the panel. The bottom half of the panel was the chipped in a Q-Panel Gravelometer machine with 2 pints of gravel at −20 degrees C. Excellent chip resistance was noted.

| Adhesion Ratings: | |
| --- | --- |
| Primer only 0 | Gravelometer |
| topcoat 1 | Rating: GM8 | where 0 = no failure
1= less than 5-% failure

Example 4

Paint Formulation with Polyester Dispersion

Preparation of Paint:

The dispersed polyester from Example 2 was formulated into a primer as follows:

1. A 201 gram aliquot of resin dispersion prepared as described in Example 2 was placed in a one liter stainless steel mixing vessel 2. 15 grams of butoxy ethanol and 26 grams of deionized water were then added to the resin dispersion 3. A vertical disperser was then inserted 4. 151 grams of TiO2 (R-920, DuPont) and 3 grams of Raven 16 were added under agitation.

5. Approximately 300 grams of 3 mm glass beads were added to the vessel, and the mixture was dispersed at high speed for 30 minutes to disperse the pigment to a 7 Hegman.

6. The mill was slowed to mixing speed, and the following let down ingredients were added under slow agitation:

106 grams of polyester dispersion
56 grams of BL-3175
5.4 grams of Cymel 303
6.8 grams of Nacure 5528
2.2 grams of DC-14

7. After incorporation of these ingredients, the mixture was filtered through a 25 micron filter cone to remove the glass beads. The pH is then adjusted to 8.2 to 8.5 with DMEA, and then reduced to 30–32 seconds #4 Ford cup with deionized water.

The resulting paint had a calculated VOC of less than 2.0 pounds per gallon, and 53% weight non-volatile.

Properties of the Paint:

The formulated paint was tested by spraying onto electrodeposition coated cold rolled steel panels. Film thickness of the primer was 1.0 mil dry. The painted panel was flashed at room temperature for 5 minutes, and then flashed an additional 10 minutes in a 180 degrees F oven. The painted panel was then baked 25 minutes at 330 degrees F. The panel was the top coated with a commercially available automotive waterborne basecoat/clearcoat system and baked 30 minutes at 250 degrees F.

Adhesion was then checked with a 3 mm crosshatch of the top coated area of the panel. Excellent adhesion was noted on the panel. The bottom half of the panel was then chipped in a Erichsen Chip tester machine with 1.0 kg. of steel shot at room temperature. Excellent chip resistance was noted.

Adhesion Rating: Topcoat 0

Erichsen Rating: 7
Where 10 best and 0 worst where 0=no failure

Example 5

Adhesion Rating Results

Procedures were conducted in accordance with SAE J400.

| Symbol | Electrocoat Bake | Primer Bake |
|---|---|---|
| U/U | 10 × 330 F. | 25 × 275 F. |
| U/T | 10 × 330 F. | 25 × 330 F. |
| U/H | 10 × 330 F. | 60 × 375 F. |
| T/U | 10 × 360 F. | 25 × 275 F. |
| T/T | 10 × 360 F. | 25 × 330 F. |
| T/H | 10 × 360 F. | 60 × 375 F. |
| H/U | 10 × 390 F. | 25 × 275 F. |
| H/T | 10 × 390 F. | 25 × 330 F. |
| H/H | 10 × 390 F. | 60 × 375 F. |

U=under bake
T=target bake
H=over bake
10×330 F.=10 minutes at 330 degrees F.

| Polyester Type | Hydroxyl Number | U/U | U/T | U/O | T/U | T/T | T/O | O/U | O/T | O/O |
|---|---|---|---|---|---|---|---|---|---|---|
| NPG | 118 | 9/4 | 3/4 | 5/9 | 9/8 | 9/8 | 1/1 | 7/4 | 1/3 | 0/1 |
| NPG/HDO | 73 | 1 2 | 0/1 | 0/0 | 3/1 | 1/1 | 0/1 | 0/1 | 0/1 | 0/1 |
| NPG | 55 | 0/0 | 0/1 | 3/0 | 0/1 | 0/1 | 0/0 | 0/1 | 0/1 | 0/1 |

Key:
0 = 0% removed
2 = 5% removed
6 = 25% removed
7 = 45% removed
10 = 95% removed EXAMPLE 6: CHIP RATING RESULTS
Procedures were conducted in accordance with ASTM D3359.

| Polyester Type | Hydroxyl Number | 2 pint chip no. | 2 pint chip size | 3 pint chip no. | 3 pint chip size | comment |
|---|---|---|---|---|---|---|
| NPG | 118 | 5 rating | B | 4 rating | B | lower end of standard hydroxyl range (100–200) |
| BEPD | 110 | 4 rating | B | 3 rating | B | lower end of standard hydroxyl range (100–200) |
| NPG/HDO | 117 | 5 rating | B | 3 rating | B | lower end of standard hydroxyl range (100–200) |
| BEPD | 117 | 4 rating | B | 4 rating | B | lower end of standard hydroxyl range (100–200) |
| NPG/BEP | 66 | 5 rating | A | 4 rating | A | target range-lower than average |
| NPG/HDO | 73 | 5 rating | A | 4 rating | A | target range-lower than average |
| NPG/BEP | 72 | 5 rating | A | 4 rating | A | target range-lower than average |
| NPG | 55 | 5 rating | A | 4 rating | A | target range-lower than average |
| BEPD | 65 | 5 rating | A | 4 rating | A | target range-lower than average |
| NPG | 38 | 5 rating | A | 4 rating | A | extremely low hydroxyl |

Chip number ratings: 5 = 25–49 chips per standard area

What is claimed is:

1. An aqueous dispersion of a polyester salt which dispersion is substantially free of emulsifier, wherein the polyester salt is a residue of a polyester having an acid value of from about 30 to about 50, a number average molecular weight of from about 1500 to about 2800 and a hydroxyl value of not more than about 90, the polyester salt providing a mean particle size in the aqueous dispersion of less than about 400 nm, the aqueous dispersion having less than about 5 weight percent organic solvent.

2. The aqueous dispersion as recited in claim 1 wherein the polymeric vehicle is effective for providing a cured primer coating composition film, the primer coating composition film, when part of a multilayer coating having at least two layers inclusive of the primer film effective for providing the multilayer paint coating with a two pint chip number rating of at least about 5 and a two pint chip size of at least about A.

3. The aqueous dispersion as recited in claim 1 wherein the polyester includes —COOH groups which may be neutralized to form a water dispersible salt.

4. The aqueous dispersion as recited in claim 1 wherein the aqueous dispersion further includes a cross linker selected from the group consisting of an amino resin, an isocyanate compound and mixtures thereof.

5. An aqueous polymer dispersion formed by a process comprising:

forming a polyester having sufficient —COOH groups to provide the polyester with an acid value of from about 30 to about 50, a number average molecular weight of about 1500 to about 2800 and a hydroxyl number of from about 50 to about 90, mixing the polyester in an organic hydrophilic solvent, wherein the polyester polymer has a solubility in the hydrophilic solvent of at least about 50 weight percent, and the organic hydrophilic solvent has a solubility in water of at least about 5 weight percent;

neutralizing at least about 30 percent of the ionizable groups of the polyester with an amount of neutralizer effective to form a solution of neutralized polymer salt;

mixing the solution of neutralized polyester salt with water to form a blend of water/organic solvent/neutralized polyester; and stripping the organic from the blend of water/organic solvent/neutralized polyester blend at not more than about 65° C. to form a dispersion of neutralized polyester salt in water, the dispersion being substantially free of emulsifier, a mean particle size of less than 400 nm and having a viscosity of less than about 10 poise at a temperature of about 25° C.

6. The aqueous polymer dispersion according to claims 5 wherein the neutralizer is selected from the group consisting of ammonia, triethanol amine, 2-amino-2-methyl-1-propanol, and dimethyl ethanol amine.

7. The aqueous polymer dispersion according to claim 5 wherein water is added to the solution of the neutralized polyester in an amount effective to provide an initial ratio of organic solvent to water of from about 0.15 to about 0.45.

8. The aqueous polymer dispersion according to claim 7 wherein organic solvent is removed without an inversion.

9. An aqueous dispersion of a polyester salt which dispersion is substantially free of emulsifier and having less than about 5 weight percent organic solvent, wherein the polyester salt is the residue of a polyester having a number average molecular weight in the range of from about 1500 to about 2800 and a hydroxyl value of from about 90 to about 50, and an acid value of from about 40 to about 50, the polyester having —COOH groups which are neutralizeable to form a water dispersible polyester salt.

10. An aqueous dispersion of a polyester salt according to claim 9 wherein the polyester has a number average molecular weight of about 1500 and a hydroxyl value of about 90.

11. An aqueous dispersion of a polyester salt according to claim 9 wherein the polyester has a number average molecular weight of about 2800 and a hydroxyl value of about 50.

12. An aqueous dispersion of a polyester salt according to claims 9, 10 or 11, the dispersion has a mean particle size of less than about 400 nm.

13. An aqueous dispersion of a polyester salt according to claim 12, wherein the aqueous dispersion further includes a cross-linker selected from the group consisting of an amino resin, an isocyanate compound and mixtures thereof.

14. An aqueous dispersion of a polyester salt, wherein the polyester salt is a residue of a polyester having carboxyl groups which provide the polyester with an acid value of from about 30 to about 50, a number average molecular weight of from about 1500 to about 2800 and a hydroxyl value of from about 90 to about 50, the polyester salt providing a mean particle size in the aqueous dispersion of less than about 400 nm, the aqueous dispersion having less than about 5 weight percent organic solvent and substantially free of emulsifier.

15. The aqueous dispersion as recited in claim 14 wherein the aqueous dispersion further includes a cross linker selected from the group consisting of an amino resin, an isocyanate compound and mixtures thereof.

16. An aqueous dispersion of a polyester salt, wherein the polyester salt is a residue of a polyester with an acid value of from about 30 to about 50, a number average molecular weight of from about 1500 to about 2800 and a hydroxyl value of from about 90 to about 50, the polyester salt providing a mean particle size in the aqueous dispersion of less than about 400 nm, the aqueous dispersion having less than about 2 weight percent organic solvent and substantially free of emulsifier.

17. The aqueous dispersion as recited in claim 16, wherein the polyester includes —COOH groups which may be neutralized to form a water dispersible salt.

18. The aqueous dispersion as recited in claims 16 or 17, wherein the aqueous dispersion further includes a cross linker selected from the group consisting of an amino resin, an isocyanate compound and mixtures thereof.

* * * * *